United States Patent
D'Onofrio et al.

(10) Patent No.: US 12,510,042 B2
(45) Date of Patent: Dec. 30, 2025

(54) DEVICE FOR DIRECT INJECTION OF A GASEOUS FUEL

(71) Applicant: LIEBHERR-COMPONENTS DEGGENDORF GMBH, Deggendorf (DE)

(72) Inventors: Mario D'Onofrio, La tour de Trême (CH); Giovanni Corbinelli, La tour de Trême (CH); Francois Masson, Villars-sur-Glâne (CH); Richard Pirkl, Regensburg (DE)

(73) Assignee: LIEBHERR-COMPONENTS DEGGENDORF GMBH, Deggendorf (DE)

( * ) Notice: Subject to any disclaimer, the term of this patent is extended or adjusted under 35 U.S.C. 154(b) by 0 days.

(21) Appl. No.: 18/711,522

(22) PCT Filed: Nov. 21, 2022

(86) PCT No.: PCT/EP2022/082571
§ 371 (c)(1),
(2) Date: May 17, 2024

(87) PCT Pub. No.: WO2023/094306
PCT Pub. Date: Jun. 1, 2023

(65) Prior Publication Data
US 2025/0012240 A1 Jan. 9, 2025

(30) Foreign Application Priority Data
Nov. 26, 2021 (DE) .................. 10 2021 131 038.5

(51) Int. Cl.
F02M 21/02 (2006.01)
F02D 19/02 (2006.01)
(Continued)

(52) U.S. Cl.
CPC ....... *F02M 21/0239* (2013.01); *F02D 19/022* (2013.01); *F02D 19/027* (2013.01);
(Continued)

(58) Field of Classification Search
CPC ............ F02M 21/0206; F02M 21/023; F02M 21/0239; F02M 21/0248; F02M 21/2075; F02M 55/04
See application file for complete search history.

(56) References Cited

U.S. PATENT DOCUMENTS 3,789,820 A * 2/1974 Douglas ............. F02M 21/0242
123/576
4,258,674 A * 3/1981 Wolff ................... F02M 47/025
123/472
(Continued)

FOREIGN PATENT DOCUMENTS

CN 113446134 A * 9/2021
DE 29520410 U1 5/1996
(Continued)

OTHER PUBLICATIONS

ISA European Patent Office, International Search Report Issued in Application No. PCT/EP2022/082571, Mar. 21, 2023, WIPO, 6 pages.

*Primary Examiner* — John M Zaleskas
(74) *Attorney, Agent, or Firm* — McCoy Russell LLP

(57) ABSTRACT

The present invention relates to a device for direct injection of a gaseous fuel, in particular hydrogen, which device comprises: a pressure-control unit which is designed to convert a supplied variable pressure level of the gaseous fuel into a fixed constant output pressure level; a distributor unit which is connected to at least one injector for direct injection of the gaseous fuel, which has been guided through the pressure-control unit, into a combustion chamber; and a fluid connection between the pressure-control unit and the
(Continued)

distributor unit in order to guide the gaseous fuel at a constant output pressure downstream towards the distributor unit. The device is characterized in that a flow-control valve is disposed along the fluid connection and designed to adjust the constant output pressure level of the gaseous fuel to a desired target pressure not exceeding the output pressure level.

17 Claims, 4 Drawing Sheets

(51) Int. Cl.
    *F02D 41/00*           (2006.01)
    *F02D 41/38*           (2006.01)
    *F02M 37/00*          (2006.01)
    *F02M 55/04*          (2006.01)

(52) U.S. Cl.
    CPC .... *F02M 21/0206* (2013.01); *F02M 21/0221* (2013.01); *F02M 21/0245* (2013.01); *F02M 21/0248* (2013.01); *F02M 21/029* (2013.01); *F02M 37/0017* (2013.01); *F02M 37/0029* (2013.01); *F02M 37/0052* (2013.01); *F02M 55/04* (2013.01); *F02D 19/024* (2013.01); *F02D 41/0027* (2013.01); *F02D 41/3809* (2013.01); *F02D 41/3836* (2013.01)

(56) References Cited

U.S. PATENT DOCUMENTS

| | | | | |
|---|---|---|---|---|
| 4,811,720 | A * | 3/1989 | Katumata | F02M 21/029 123/549 |
| 5,408,957 | A * | 4/1995 | Crowley | F02D 19/0689 123/27 GE |
| 5,611,316 | A * | 3/1997 | Oshima | F02D 19/022 123/529 |
| 7,036,491 | B2 | 5/2006 | Ricco et al. | |
| 7,140,354 | B1 * | 11/2006 | Hashemi | F02D 19/024 123/456 |
| 2004/0139947 | A1 * | 7/2004 | Serizawa | F02M 55/025 123/468 |
| 2004/0200457 | A1 * | 10/2004 | Gottemoller | F02M 55/002 123/468 |
| 2005/0199225 | A1 * | 9/2005 | Davis | F02M 21/0215 123/557 |
| 2005/0241624 | A1 * | 11/2005 | Ricco | F02M 21/0239 123/527 |
| 2005/0241625 | A1 * | 11/2005 | Ricco | G05D 16/2097 123/527 |
| 2006/0213488 | A1 * | 9/2006 | Post | F02M 21/0239 123/527 |
| 2008/0099002 | A1 * | 5/2008 | Boyer | F02D 41/0027 123/527 |
| 2008/0135005 | A1 * | 6/2008 | Kotwicki | F02M 21/0293 123/1 A |
| 2008/0135019 | A1 * | 6/2008 | Audisio | F02M 21/0239 701/103 |
| 2010/0089364 | A1 * | 4/2010 | Flanagan | F02D 41/22 123/435 |
| 2012/0277984 | A1 * | 11/2012 | Maier | B60K 15/03006 701/115 |
| 2013/0199499 | A1 * | 8/2013 | Pursifull | F02D 41/0025 123/456 |
| 2013/0247876 | A1 * | 9/2013 | Ninomiya | G05D 16/2022 123/458 |
| 2013/0255636 | A1 * | 10/2013 | Pursifull | F02D 19/0628 123/446 |
| 2013/0255808 | A1 * | 10/2013 | Ninomiya | F02M 21/0242 137/624.27 |
| 2014/0034023 | A1 * | 2/2014 | Coldren | F02M 21/0257 123/472 |
| 2014/0076283 | A1 * | 3/2014 | Pursifull | F02M 21/0239 123/457 |
| 2014/0081565 | A1 * | 3/2014 | Pursifull | F02D 19/022 123/457 |
| 2014/0209179 | A1 * | 7/2014 | Maier | F02D 41/222 137/12 |
| 2014/0238340 | A1 * | 8/2014 | Dunn | F02D 19/0642 123/299 |
| 2014/0305406 | A1 * | 10/2014 | Pursifull | F02M 57/026 123/434 |
| 2014/0311454 | A1 * | 10/2014 | Pursifull | F02D 19/0628 123/468 |
| 2015/0122224 | A1 * | 5/2015 | Pursifull | F02D 19/024 123/456 |
| 2015/0337769 | A1 * | 11/2015 | Yoshioka | F02M 21/0206 137/512 |
| 2016/0169181 | A1 * | 6/2016 | Graham | F02M 63/02 239/536 |
| 2016/0177857 | A1 * | 6/2016 | Sarikaya | F02M 37/0023 73/114.38 |
| 2017/0138312 | A1 * | 5/2017 | Caley | F02M 21/0239 |
| 2021/0301775 | A1 * | 9/2021 | Puran | F02M 21/023 |
| 2022/0154673 | A1 * | 5/2022 | Brown | F02M 61/168 |

FOREIGN PATENT DOCUMENTS

| | | | | |
|---|---|---|---|---|
| DE | 19840460 A1 | * | 3/1999 | ........... F02D 19/022 |
| DE | 102009031933 A1 | | 1/2011 | |
| DE | 102013003091 A1 | | 8/2014 | |
| DE | 102016205713 A1 | * | 10/2017 | |
| EP | 1936174 A1 | | 6/2008 | |
| EP | 3095994 A1 | * | 11/2016 | |
| EP | 3885640 A2 | | 9/2021 | |
| JP | 2017166424 A | * | 9/2017 | |
| WO | WO-2006079173 A1 | * | 8/2006 | ........... F02D 19/022 |
| WO | WO-2013008443 A1 | * | 1/2013 | ............. F23K 5/002 |

* cited by examiner

DEVICE FOR DIRECT INJECTION OF A GASEOUS FUEL

CROSS REFERENCE TO RELATED APPLICATIONS

The present application is a U.S. National Phase of International Application No. PCT/EP2022/082571 entitled "DEVICE FOR DIRECT INJECTION OF A GASEOUS FUEL," and filed on Nov. 21, 2022. International Application No. PCT/EP2022/082571 claims priority to German Patent Application No. 10 2021 131 038.5 filed on Nov. 26, 2021. The entire contents of each of the above-listed applications are hereby incorporated by reference for all purposes.

TECHNICAL FIELD

The present invention relates to a device for direct injection of a gaseous fuel, in particular hydrogen.

BACKGROUND AND SUMMARY

To protect the environment, there are increasing efforts to develop alternative fuel strategies that focus on reducing $CO_2$ emissions. In particular, the focus is on further developing the existing combustion engine, for example by replacing the diesel fuel used with "green" fuels such as $H_2$ in the gas phase. For rapid dissemination and acceptance, it is necessary that these new engines deliver the same or better performance compared to the conventional generation of engines (e.g. diesel engines), both in stationary and in transient/dynamic operation.

In recent years, conventional combustion engines have been dominated by liquid fuels made from petrol (mainly petrol and diesel). Many experiments have been designed in the field of combustion engines using gaseous fuels such as natural gas (CNG) or liquefied petroleum gas (LPG), including their associated injection systems. In these cases, however, an indirect multi-point injection system (MPI) is used in the series production of combustion engines, in which the gas is injected into the intake manifold of the engine at low pressure, typically <10 bar. With this type of technology, the injection pressure is almost constant and does not require rapid pressure changes.

However, new research into combustion engines that are fed with gaseous fuels (CNG or $H_2$) with the aim of optimizing engine performance shows that there appears to be no alternative to direct injection technology (i.e. feeding the gaseous fuel directly into the combustion chamber of an engine cylinder) for reasons of performance and efficiency. To enable precise metering of the desired fuel quantity, the injection system requires highly dynamic pressure control capabilities, which were not necessary with MPI technology, as the gaseous fuel is continuously fed to the injection nozzles at a constant pressure of around 10 bar or less.

The present invention proposes an effective solution to enable improved pressure dynamics and control through a novel system design concept.

A key requirement in the development of an injection system is the design of the engine and the other components, as well as the very limited space available for the arrangement of the system. A compromise must therefore be found between performance and size in order to optimize the overall performance of a machine or vehicle fitted with the injection system.

FIG. 1 shows a conversion known from the prior art, in which a gaseous fuel is blown into a combustion chamber via an injector. As will be described in more detail later in the section of the figure description, it can be seen that the pressure setpoint deviates significantly from the actual pressure value in the rail, such that injecting the gaseous fuel via the injectors does not always produce the desired performance result. As the invention has recognized, one of the reasons for this is that the electric pressure control valve arranged between a gas reservoir and the rail has a large control volume located downstream. This cannot be reduced in size either, as the pressure control valve has to be located near the gas reservoir in order to minimize the very high pressures (approx. 350 bar) prevailing there and the associated complex piping.

As direct gas injection is a technology that is not yet used in series production, there are currently no known solutions on the market that fulfil the requirements for both the dynamics of pressure control and the flow rate (low-duty and heavy-duty machines require a very reliable and precisely controllable $H_2$ flow rate).

The developments known today correspond in their basic design to the current low-pressure control used in MPI engines and use a single pressure-control unit (electrical PRV component) that integrates the entire functionality: tank pressure stabilization and dynamic control to the setpoint.

This component is normally installed at the outlet of the tank or on the machine chassis to avoid the vibrations, thermal and mechanical stresses typical of a solution mounted in the engine compartment. The main disadvantages and limitations of such a solution are the large component size with the resulting restriction of the arrangement density and layout flexibility, an increased component weight, as well as the mechanical and thermal stress due to assembly in the engine compartment. Overall, it is therefore not recommended to arrange them in the engine compartment. In addition, arrangement outside the engine compartment results in a large control volume downstream of the regulator and thus a high response inertia (which cannot be reduced by the internal volume of the system and the long lines between the regulator and injector).

Since the use of hydrogen in gaseous form as a fuel for direct injection is very demanding in terms of transient and dynamic behavior, the aim of the present invention is to mitigate or overcome the above-mentioned disadvantages. In particular, the aim is to ensure fast and accurate pressure control regardless of the position of the tank in the vehicle and the size of the machine or vehicle.

This is achieved with a device, which has all the features of claim 1. Advantageous embodiments of the present invention are found in the dependent claims.

The device according to the invention for direct injection of a gaseous fuel, in particular hydrogen, which device comprises: a pressure-control unit which is designed to convert a supplied variable pressure level of the gaseous fuel into a fixed constant output pressure level; a distributor unit which is connected to at least one injector for direct injection of the gaseous fuel, which has been guided through the pressure-control unit, into a combustion chamber; and a fluid connection between the pressure-control unit and the distributor unit in order to guide the gaseous fuel at a constant output pressure downstream towards the distributor unit. The device is characterized in that a flow-control valve is disposed along the fluid connection and designed to adjust the constant output pressure level of the gaseous fuel to a desired setpoint pressure not exceeding the output pressure level.

In contrast to the prior art, pressure regulation is now carried out by two different components. Whereas it was previously common practice to provide a pressure-control valve between the gas reservoir and the distributor unit, which is capable of converting the gas pressure provided by the gas reservoir to a specific, variable output pressure as required, the invention takes a different approach.

According to the invention, it is intended to utilize a pressure-control unit and a flow-control valve arranged downstream thereof in order to overcome the disadvantages conventionally faced. This means that the gaseous fuel compressed under a very high pressure (up to 350 bar) in a gas reservoir (or in liquid form in the reservoir) is first lowered to a fixed constant intermediate pressure level (e.g. 60 bar) via the pressure-control unit and only adjusted downstream to the pressure actually required in the distributor unit (e.g. to a value in the range of 10-60 bar) using the flow-control valve.

The advantage of separating the function into two different components (pressure-control unit and flow-control valve) according to the invention is that the downstream volume (control volume) can be reduced by arranging the flow-control valve accordingly. This then leads to a reduction in the deviations from a desired set pressure value in the distributor unit to a prevailing actual pressure value, as it is possible to change the prevailing pressure value in the distributor unit more quickly.

The value of the pressure that feeds the injection nozzles is the result of the flow equilibrium between the volume flow that enters the control volume (rail+lines+injection nozzles) and the flow that must leave the control volume (engine requirements). The time for emptying the control volume is proportional to the size of the control volume. By minimizing the control volume, the reaction time of the system is also minimized, such that pressure control can take place very quickly.

In accordance with the typical requirements of light and heavy-duty applications, pressure control in the range of 10-80 bar, preferably 10-60 bar, with a pressure gradient of 20-60 bar/second, preferably 40-60 bar/second, for example 50 bar/second, is advantageous.

A further advantage of the invention is that the control volume, which has to be brought into a gas-free state each time an engine is started, is reduced.

According to an optional modification of the invention, it can be provided that the flow-control valve is arranged on the half of the fluid connection facing the distributor unit, preferably on the quarter of the fluid connection leading away from the distributor unit, more preferably on the tenth of the fluid connection leading away from the distributor unit, and most preferably directly on the distributor unit.

Placing the flow-control valve at or near the distributor unit results in a smaller volume, the pressure of which the flow-control valve must change. This results in improved dynamic response behavior in the event of a pressure control request for the pressure state of the distributor unit or the injectors fed by it. According to a further development of the invention, it can be provided that the fluid connection comprises a flexible fluid connection, in particular a flexible pipe or flexible hose to decouple vibrations between the distributor unit and the pressure-control unit, for example. An implementation can also be provided in which the fluid connection consists of a plurality of parts, only one of which is flexible.

By using a flexible fluid connection between the pressure-control unit and the distributor unit, vibrations that typically occur in the area of the distributor unit due to its close proximity to the engine or combustion chamber can be decoupled. This means that vibrations are not transmitted to the pressure-control unit, or only at a very low level, so that the vibration resistance requirements for the pressure-control unit can be reduced.

It can also be provided that the invention has a reservoir, in particular a gas reservoir or tank, for supplying a gaseous fuel to the pressure-control unit with a variable pressure level as a function of the fill level. According to the invention, it is also included that the fuel dispensed in gaseous form via the injectors is present in liquid form in the reservoir.

Typically, the fuel, which is later blown into the combustion chamber in its gaseous state, is stored at a very high pressure (e.g. approx. 350 bar) in a tank or gas reservoir. The gas reservoir can also consist of a large number of storage elements in order to optimally utilize the space available in a vehicle.

According to a further development of the invention, it can be provided that the flow-control valve is also capable of interrupting a fluid connection between the pressure-control unit and the distributor unit in order to completely shut off the fuel supply to the distributor unit.

This makes it possible to dispense with the provision of a separately required shut-off valve, which ensures a supply of fuel even for a longer period of inactivity of the device (for example when the vehicle is parked). This reduces the number of components required, leading to a reduction in complexity and a reduction in overall weight, which is advantageous in terms of performance efficiency.

Furthermore, according to an advantageous modification of the present invention, it can be provided that this is provided with an electronic control unit, which is designed to control the flow-control valve and the at least one injector, preferably as a function of a temperature and/or pressure value detected in the distributor unit.

The object of the electronic control unit is to control the flow of fuel into the distributor unit and the opening or closing of the at least one injector connected to the distributor unit. In order to provide the corresponding power characteristic desired by an operator for an engine co-operating with the device, it receives corresponding commands from an operator and converts these into corresponding control signals. The signals transmitted to the flow valve and the at least one injector can vary depending on the pressure and/or temperature prevailing in the distributor unit. If, for example, a spontaneous demand for power is required by an operator, a certain increased pressure level must be reached as quickly as possible in the distributor unit, so that the flow valve must be opened depending on the pressure level already prevailing. If, on the other hand, the temperature in the distributor unit is above a threshold value, the fuel flow through the flow valve can be kept below the possible maximum or even reduced, despite a spontaneous power request from the operator, in order to keep the efficiency of the combustion process taking place in the combustion chamber as high as possible.

For this purpose, the device can also be provided with a temperature sensor and/or pressure sensor arranged in the distributor unit for transmitting the measured values to the electronic control unit.

According to an optional modification of the present invention, it can be provided that the distributor unit is a rail, in particular a common rail, or a distributor block, wherein the flow-control valve is preferably integrated into or arranged on the distributor block.

Furthermore, according to the present invention it can be provided that a plurality of injectors is connected to the distributor unit, which injectors are arranged in at least a daisy chain configuration in which a plurality of injectors is connected to a common output of the distributor unit. It is therefore possible for the distributor unit to have fewer outputs than there are injectors to be supplied with fuel. A plurality of injectors is then simply supplied with fuel from one of the outputs of the distributor block. For example, if the distributor unit has two outputs and there are six injectors, three injectors can each be connected to one of the two outputs of the distributor unit. The advantage of this is that there is a smaller control volume than in the case where each injector has its own line to the distributor unit or distributor block.

According to an optional modification of the present invention, it can be provided that the pressure-control unit is a mechanical pressure-control unit, preferably a mechanical, single-stage pressure-control unit. A pressure-control valve can also be used to implement the pressure-control unit.

According to a further development of the present invention, it can be provided that the pressure-control unit is designed to regulate the fixed constant output pressure level to a pressure in a range of 40-80 bar, preferably 50-70 bar and most preferably 55-65 bar. By setting the pressure through the pressure-control unit to a fixed stationary value, it is easier for the downstream flow-control valve to achieve a desired pressure setpoint. Finally, the flow-control valve no longer needs to be able to provide the corresponding pressure setpoints based on different inlet pressures.

According to a variant of the present invention, it can further be provided that the gas reservoir is designed to store a fuel, in particular hydrogen, at a pressure in the range of 300-400 bar, preferably 320-370 bar and more preferably 345-355 bar.

According to a further advantageous modification of the present invention, it can be provided that the device is provided with a shut-off valve configured to shut off the fluid connection between the pressure-control unit and the distributor unit. Preferably, it can be provided that the shut-off valve is integrated into the flow-control valve, wherein the invention also includes that the flow-control valve and the shut-off valve are separate elements. When implementing two separate elements, it is particularly advantageous if the shut-off valve is arranged at a distance from the flow-control valve and has a distance along the fluid connection to the flow-control valve of at least 50 cm, preferably 60 cm and more preferably 70 cm.

The advantage here is that the gas intake is reduced when the engine is stopped or during start-stop operation, as the shut-off valve can shut off the fluid connection at an early stage.

The invention also relates to a vehicle with a device according to any one of the variants discussed above, wherein the engine compartment of the vehicle forms a first zone in which the distributor unit, the at least one injector and the flow-control valve are arranged, and areas other than the engine compartment form a second zone in which the pressure-control unit, and preferably also a gas reservoir, is arranged.

The engine compartment typically describes the area of a vehicle that is intended to accommodate the engine and is preferably structurally separated from other areas of the vehicle.

According to the invention, it may further be provided that the vehicle provided with a device according to any one of the aspects defined above comprises an engine, in particular an internal combustion engine, wherein the flow-control valve is arranged no more than 2 m from a center of gravity of the engine. Advantageously, the flow-control valve is located in the engine compartment. In such a case, it can typically be provided that the fluid connection has a multi-part design and that the flow-control valve is not arranged directly on the distributor unit.

It can also be provided that the fluid connection between the pressure-control unit and the distributor unit extends from the first zone into the second zone and is embodied in particular by a flexible pipe or a flexible hose.

This is advantageous as the vibrations typically generated by the engine are not transmitted upstream towards the pressure-control unit or gas reservoir due to the flexible design of the fluid connection in the form of a flexible pipe or flexible hose.

According to the invention, it can therefore be provided that the first zone and the second zone are separated from one another by separating means in order to reduce vibrations, acoustic waves and/or thermal influences emanating from one of the two zones.

The separating means can be formed by the vehicle structure of the vehicle, but can also be realized by lining the engine compartment (for example with acoustic mats or the like).

BRIEF DESCRIPTION OF THE FIGURES

Further features, details and advantages of the invention can be seen in the following description of the figures. In the figures.

DETAILED DESCRIPTION

Figure 1:
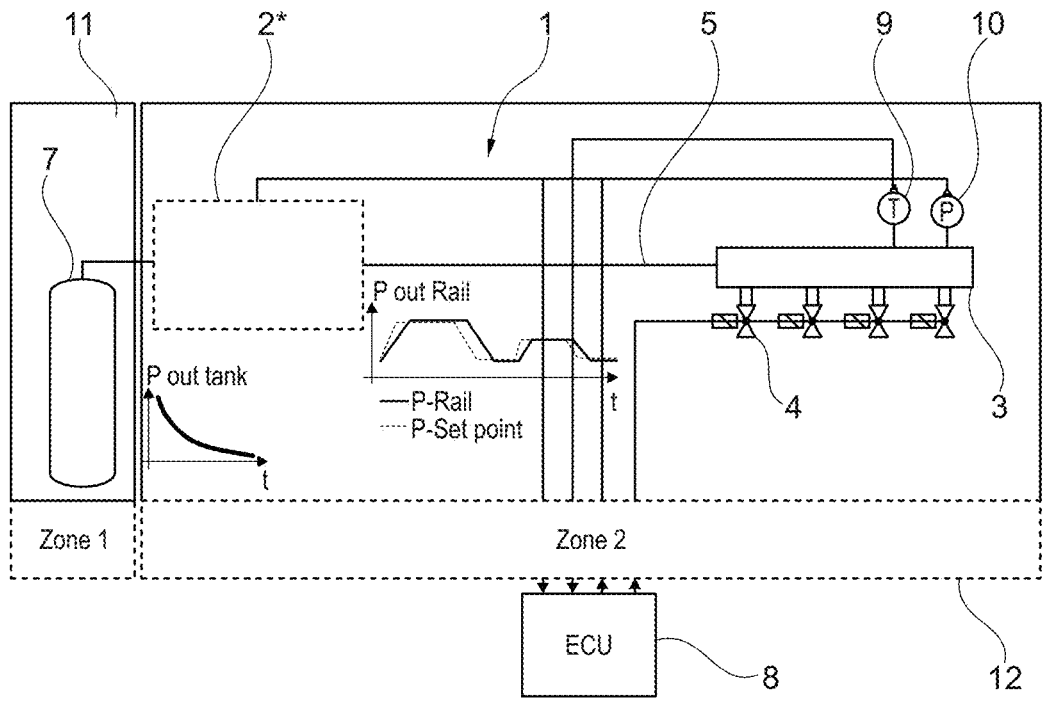
FIG. 1: shows a schematic sketch of a device known from the prior art for direct injection of a gaseous fuel.

FIG. 1 shows a schematic sketch of a device 1 known from the prior art for direct injection of a gaseous fuel.

The prior art is based on the technology of the current low-pressure control used in MPI engines and uses a single electronic PRV component 2* (pressure regulation valve component or pressure regulation unit) that integrates the entire functionality of tank pressure stabilization and regulation of the pressure of the fuel to be injected through the injectors to a setpoint.

This pressure-control unit 2* is normally installed at the outlet of the tank 7 or on the machine chassis to avoid the vibrations, thermal and mechanical stresses typical of a solution mounted in the engine compartment. The main disadvantages and limitations of such a solution are the large component size with the resulting restriction of the possible component density and layout flexibility, as well as an increased component weight. Installation in the engine compartment is de facto ruled out due to the vibrations and mechanical and thermal stresses prevailing there. Another disadvantage is the large control volume downstream of the regulator and the associated high reaction inertia (cannot be reduced by the internal volume of the system, long lines between regulator 2\* and injector 4).

In the implementation known from the prior art, the first zone 11, which characterizes the fuel supply area, comprises only the gas reservoir 7. The second zone 12, which characterizes the control volume of the fuel, on the other hand, comprises the downstream components of the device 1. Thus, the electrical pressure-control unit 2\* known from the prior art is used to output the pressure to be set in the distributor unit 3. In order to bridge the spatial distance between the pressure-control unit 2\*, which is typically arranged on the gas reservoir 7, and the distributor unit 3, a fluid connection 5 is provided, which carries a fuel at the pressure level of the distributor unit 3 over its entire length.

The graph to the right of the gas reservoir 7 shows the output pressure of the gas reservoir 7, which is arranged over time t. As the fill level drops, the output pressure of the gas reservoir 7, which is fed to the pressure-control valve 2\*, also drops. This pressure-control valve 2\* must therefore be able to output the desired set pressure based on different output pressures of the gas reservoir 7, which leads to a relatively complex design of the pressure-control unit 2\*.

Another disadvantage is that the control volume to be provided with the set pressure is relatively large, as this completely encompasses not only the distributor unit 3 but also the fluid connection 5.

Looking at the graph to the right of pressure-control unit 2\*, which shows the output pressure of pressure-control unit 2\* over time t, the desired setpoint value can be seen in dotted lines and the actual value of the output pressure of the pressure-control unit 2\* achieved in a continuous line. Due to the large control volume (through the fluid connection 5 and the distributor unit 3), dynamic pressure change requirements can only be implemented with a certain time delay. This can be recognized, for example, by the different steepness of the flanks and the greater overall deviation of the two curves. The control commands issued by the electronic control unit 8 can therefore only be reached with a certain time delay.

Figure 2:
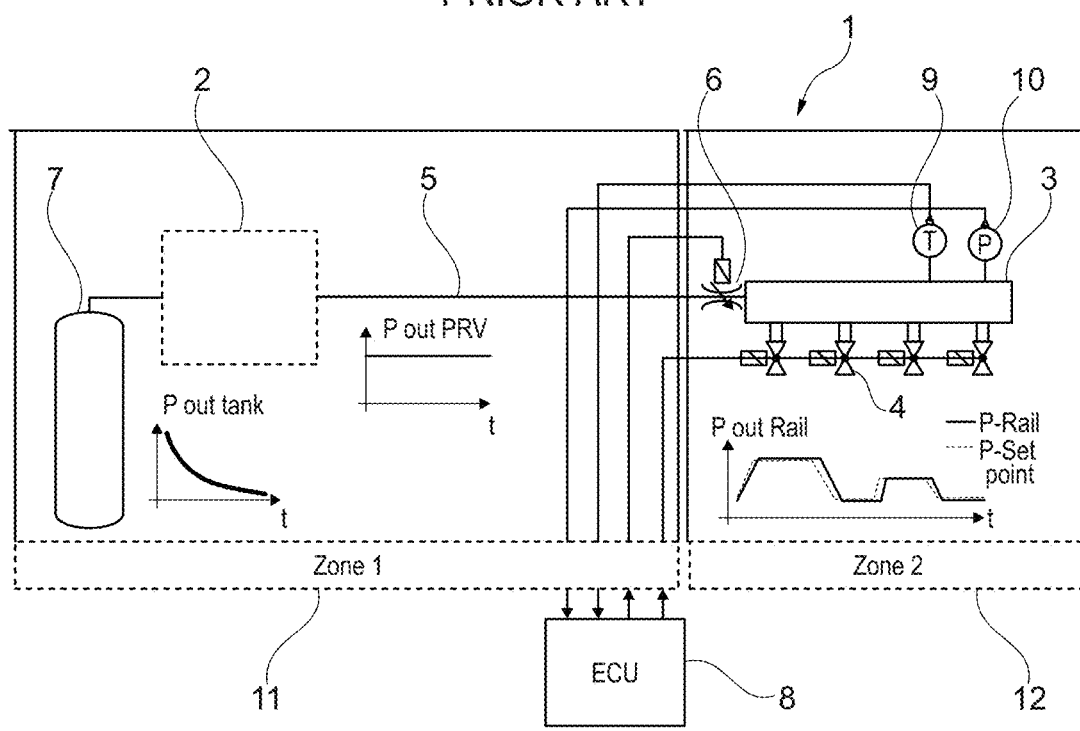
FIG. 2: shows a schematic sketch of a device according to the invention for direct injection of a gaseous fuel.

FIG. 2 shows a device 1 according to the invention. Starting from a reservoir 7 or tank, the fuel present in gaseous form at the output of the reservoir 7 is also fed into the distributor unit 3 so that the injectors 4 connected to it can dispense the gaseous fuel at a desired pressure level.

In contrast to the device known from the prior art, a pressure-control unit 2 is connected to the output of the reservoir 7, which dispenses the fuel at a constant fixed pressure. This pressure is, for example, in the range of approx. 60 bar and therefore significantly below the prevailing pressure level of approx. 350 bar in the reservoir 7. Downstream of the pressure-control unit 2, a flow-control valve 6 is connected via a fluid connection 5, which, separately from the pressure-control unit 2, has the object of generating the variable pressure levels to be set in the distributor unit 3.

To the right of reservoir 7, the pressure P can again be seen plotted over time t, which drops as the fill level of the reservoir 7 drops. In contrast to the pressure-control unit 2\* known from the prior art, the object of the pressure-control unit 2 according to the invention is to bring the fuel coming from the reservoir 7 to a constant fixed pressure level. The fuel with this constant fixed pressure level is then routed via the fluid connection 5 to the flow-control valve 6, which is typically arranged in the area of the distributor unit 3. This reduces the control volume to which a variable fuel pressure is applied. Finally, implementations are conceivable in which, for example, the control volume can be reduced to the distributor unit 3 and the injectors 4 connected thereto. The flow-control valve 6 is designed to output the desired, variable pressure values that are to prevail in the distributor unit 3, starting from the constant fixed output pressure of the pressure-control unit 2.

To the right of the pressure-control unit 2, the output pressure level P over time t can be seen, which is fed from the pressure-control unit 2 to the flow-control valve 6 via the fluid line 5. The flow-control valve 6 maintains a constant fuel pressure level, irrespective of the fill level of the reservoir 7, from which the desired pressure setpoints are set. Below the distributor unit a graph shows the pressure prevailing in the distributor unit over time t. The continuous line in this graph describes the actual pressure of the fuel, whereas the dashed line indicates the pressure setpoint of the fuel. It can be seen that the deviations of the two curves shown in the graph differ only minimally from each other and are much closer together than the corresponding counterpart in FIG. 1.

It can also be seen that the first zone 11, which defines the fuel supply area without load-dependent, variable pressure fluctuations, now contains not only the reservoir 7 of the device 1, but also the pressure-control unit 2 and part of the fluid connection 5.

The second zone 12, on the other hand, which designates the components with the control volumes of a varying pressure to be controlled, has been reduced, since large parts of the fluid connection 5 arranged upstream of the flow-control valve 6 interact with a constant fixed pressure of the fuel. The reduction in the control volume also results in the improved response behavior of the varied pressure in the distributor unit 3.

The electronic control unit 8 is connected to a temperature sensor 9, which measures the temperature in the distributor unit 3. In addition, the electronic control unit 8 is also connected to a pressure sensor 10, which reports the prevailing pressure in the distributor unit 3. It can be provided that the flow-control valve 6 or the injectors 4 connected to the distributor unit 3 are actuated depending on the pressure and/or temperature in the distributor unit 3.

It can be provided that the second zone 12 defines the engine compartment of a vehicle and the first zone 11 describes areas other than the engine compartment of a vehicle. The advantages described above can be achieved by arranging the flow-control valve 6 in the engine compartment and the pressure-control unit 2 at a position remote therefrom. It is also advantageous if the fluid connection is a flexible fluid connection, for example a flexible pipe or a flexible hose, in order to decouple vibrations emanating from the engine compartment to the upstream components such as the pressure-control unit 2 and reservoir 7.

Figure 3:
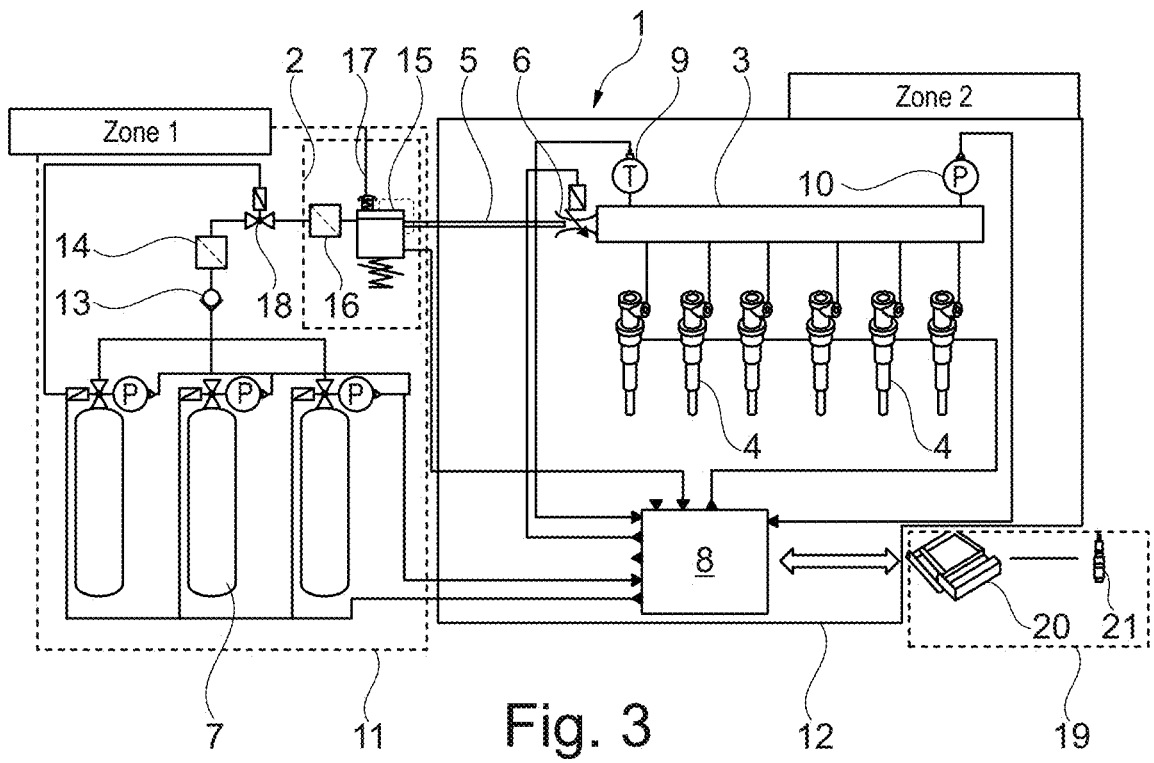
FIG. 3: shows a schematic sketch of a further exemplary embodiment of a device according to the invention for direct injection of a gaseous fuel.

FIG. 3 shows a further schematic sketch of a further embodiment of the present invention. It can be seen that the flow-control valve 6 is now arranged directly on the distributor unit 3, which is a rail in the present case.

It can also be seen that the reservoir 7 now consists of an arrangement of a plurality of tanks connected in parallel, which are connected via a check valve 13, a filter 14 and a two-way valve 18. Downstream of this is the pressure-control unit 2, which is realized with a single-stage pressure-control valve 15. This can have a filter 16 and the corresponding valve 15, which has a blow-off line 17 through which gaseous fuel with a pressure level that is too high and needs to be drained can be drained if necessary. The fuel delivered in gaseous form via the injectors can also be in liquid form in the reservoir 7 and only attain its gaseous state in the reservoir 7 itself or downstream.

The electronic control unit 8 can be designed to control the plurality of tanks of the reservoir 7 and their outlet openings, such that the pressure-control unit 2 is supplied with a fuel with pressure that varies depending on the fill levels of the tanks of the reservoir 7, which the pressure-control unit 2 converts to a constant fixed level. In addition, the electronic control unit 8 is also connected to an engine control unit 20 (see double arrow), which in turn is responsible for activating the spark plugs 21. In order to achieve a coordinated injection of the gaseous fuel, it is advantageous to actuate the injectors 4 at a correspondingly coordinated time.

Figure 4:
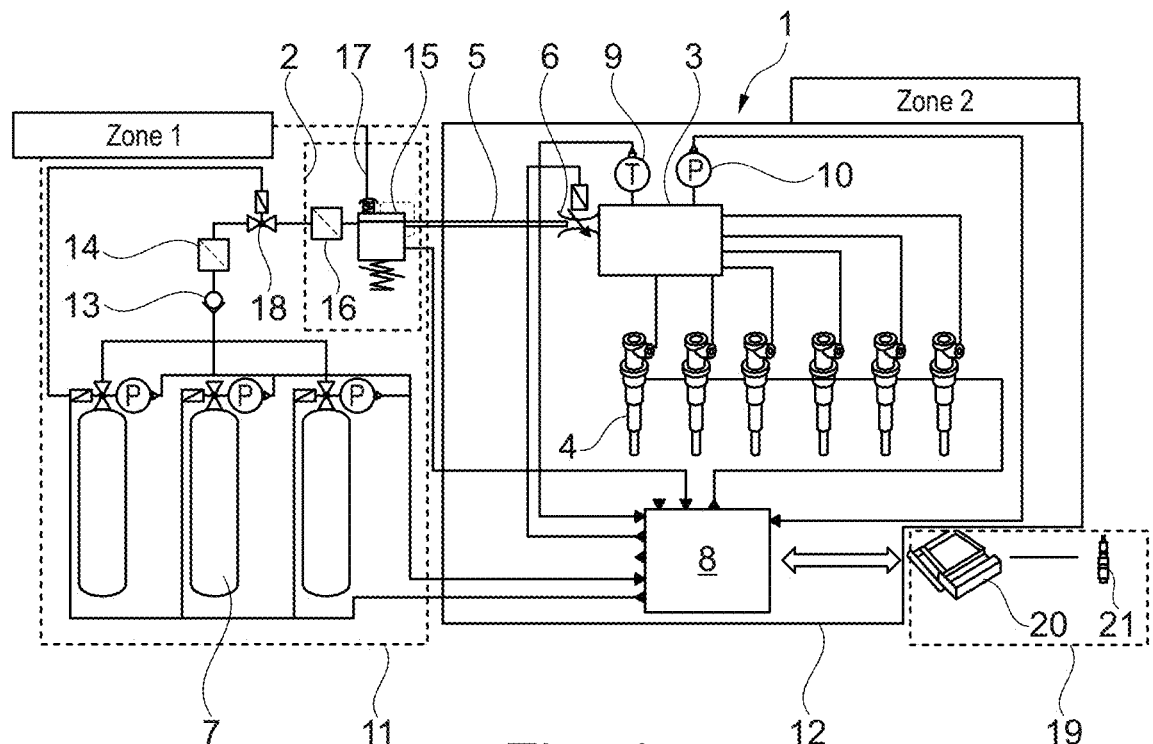
FIG. 4: shows a schematic sketch of a further exemplary embodiment of a device according to the invention for direct injection of a gaseous fuel.

FIG. 4 shows a slightly modified variant of the embodiment of the present invention shown in FIG. 3, in which the distributor unit 3 is now not a rail or common rail, but a distributor block for gaseous fuel. This distributor block can contain a plurality of components in one assembly and comprises, for example, the flow-control valve 6 and the pressure sensor 10 and/or the temperature sensor 9. By integrating the plurality of components into a single assembly, the control volume in which the variable injection pressure of the fuel prevails can be further reduced.

Figure 5:
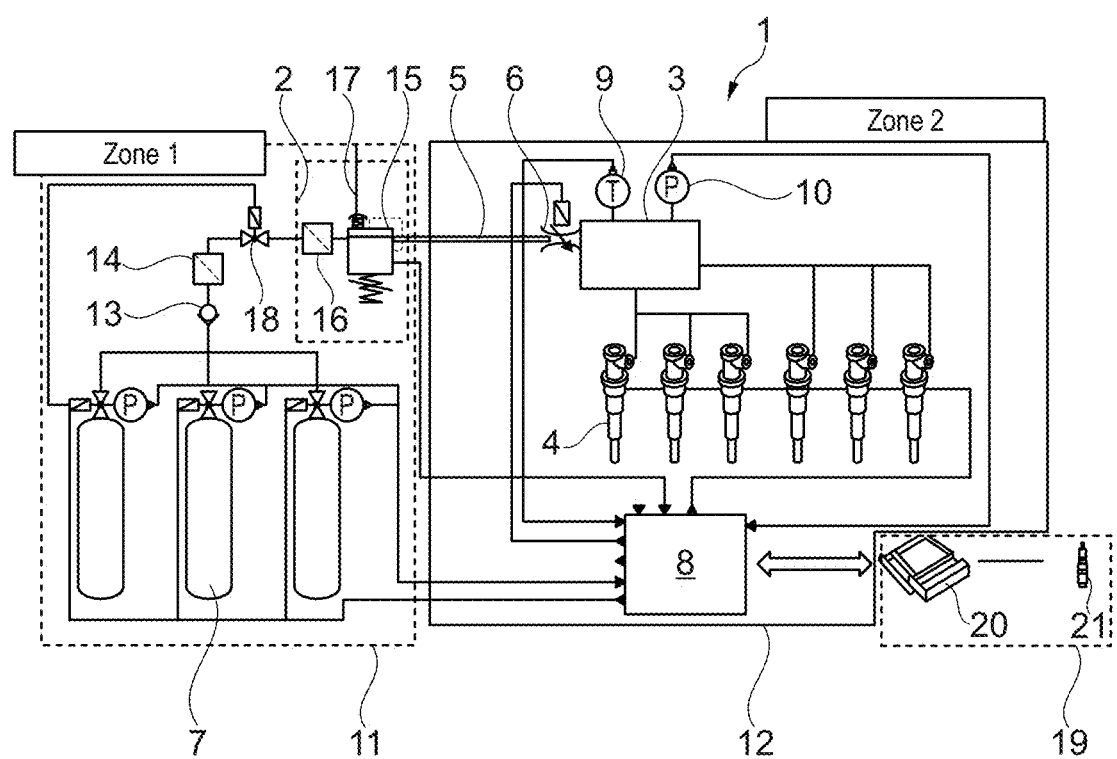
FIG. 5: shows a schematic sketch of a further exemplary embodiment of a device according to the invention for direct injection of a gaseous fuel.

FIG. 5 is a further development of the previous layout of FIG. 3, in which the distributor block (as distributor unit 3) has fewer outputs than injectors 4 to be supplied with fuel. This is advantageous in particular when integrating the device 1 according to the invention into an engine compartment, as this allows different injectors to be connected to different sides of the distributor block in the very confined space available. It is possible that a plurality of the injectors 4 is connected to the same output of the distributor block. The advantage of this embodiment is that the control volume to be controlled is further reduced, as the volume of the lines running to the plurality of injectors 4 can be further reduced as a result. If each of the existing injectors 4 does not have its own line, but a plurality of injectors is brought together in terms of lines before being connected to the distributor block or a distributor unit 3, the volume of lines to be controlled is smaller compared to a separate line for each injector 4. As already explained above, the reduction of the control volume is accompanied by an improvement in the response behavior when the pressure is varied, so that an improved approximation to the desired target pressure level is achieved.

Figure 6:
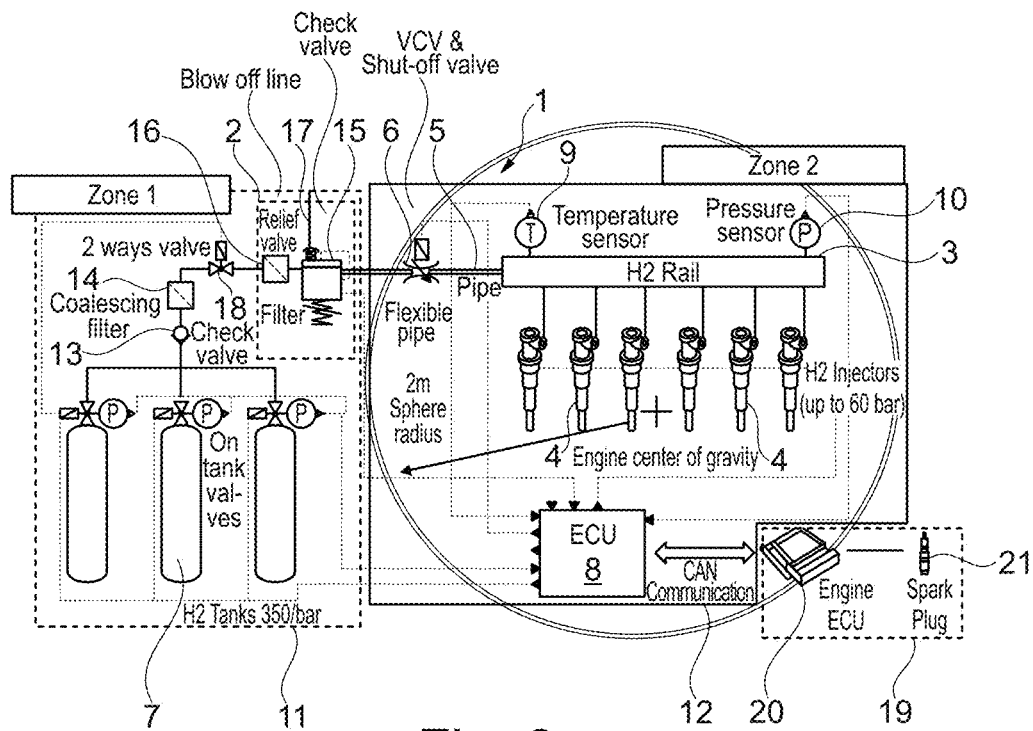
FIG. 6: shows a schematic sketch of a further exemplary embodiment of a device according to the invention for direct injection of a gaseous fuel.

FIG. 6 shows a further development of the present invention, from which it can be seen that the fluid connection 5 to the distributor unit 3 does not have to be in one piece or consist of a single line. In the present case, it can be seen that the fluid connection 5 is made in several parts and the flow-control valve 6 is arranged at a distance from the distributor unit 3 via a component of the fluid connection 5. For example, the plurality of assemblies of the fluid connection 5 between the pressure-control unit 2 and the distributor unit 3 may have a rigid component and a flexible component. For example, it can be provided that the connection from the distributor unit 3 to the flow-control valve 6 is rigid and the connection between the flow-control valve 6 and the pressure-control unit 2 is flexible. It is clear to a person skilled in the art that a reverse arrangement of the flexible and rigid components is also encompassed by the invention.

A circle shown in FIG. 6 can also be seen, as well as a plus symbol in the center, which indicates the center of gravity of an engine. The flow-control valve is advantageously arranged in such a way that it is no further than 2 m away from the center of gravity of the engine. The circle indicating the permissible range within the 2 m thus defines the permissible range in which the flow-control valve 6 can be arranged.

Figure 7:
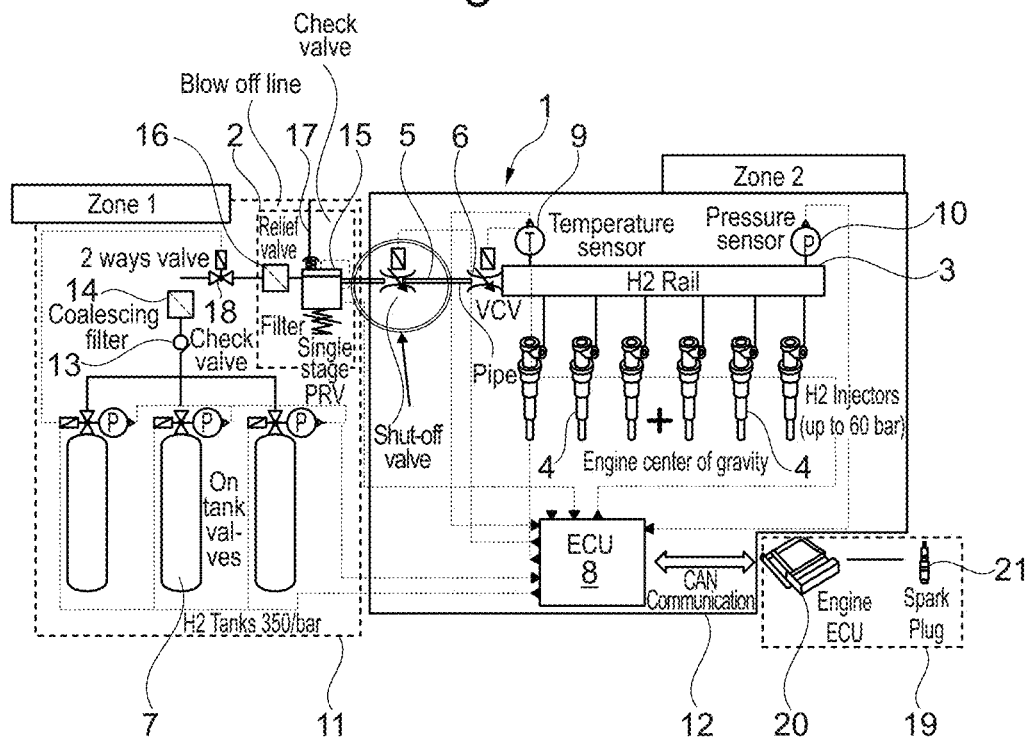
FIG. 7: shows a schematic sketch of a further exemplary embodiment of a device according to the invention for direct injection of a gaseous fuel.

FIG. 7 shows a further development of the present invention and, in contrast to the preceding embodiments, contains a separate shut-off valve which is arranged between the flow-control valve 6 and the pressure-control unit 2. The separate shut-off valve is surrounded by a circle for better visibility.

The invention claimed is:

1. A device for direct injection of a gaseous fuel, comprising:
    a pressure-control unit, which is designed to convert a supplied variable pressure level of the gaseous fuel into a fixed output pressure level,
    a plurality of tanks connected in parallel and configured to hold the gaseous fuel, the plurality of tanks fluidly connected to the pressure-control unit via a first fluid connection,
    a check valve, a filter, and a two-way valve arranged on the first fluid connection,
    a distributor unit comprising a plurality of outputs connected to injectors for direct injection of the gaseous fuel, which has been guided through the pressure-control unit, into a combustion chamber, wherein a plurality of the injectors are connected to an output of the plurality of outputs,
    a second fluid connection between the pressure-control unit and the distributor unit configured to guide the gaseous fuel at the fixed output pressure level downstream towards the distributor unit, wherein the second fluid connection is a flexible pipe,
    a flow-control valve arranged directly on the distributor unit, and designed to adjust the fixed output pressure level of the gaseous fuel to a variable desired setpoint pressure not exceeding the fixed output pressure level,
    a temperature sensor configured to measure a temperature value in the distributor unit,
    a pressure sensor configured to measure a pressure value in the distributor unit, and
    an electronic control unit configured to control the flow-control valve and the injectors as a function of the temperature value and the pressure value detected in the distributor unit.

2. The device according to claim 1, wherein the flexible pipe decouples vibrations between the distributor unit and the pressure-control unit.

3. The device according to claim 1, wherein the plurality of tanks comprise a reservoir for supplying the gaseous fuel to the pressure-control unit with a variable pressure level as a function of a fill level of the reservoir, the reservoir designed to store fuel at a pressure in the range of 300-400 bar.

4. The device according to claim 1, wherein the flow-control valve is also capable of interrupting the second fluid connection between the pressure-control unit and the distributor unit in order to completely shut off supply of the gaseous fuel to the distributor unit.

5. The device according to claim 1, wherein the temperature sensor and the pressure sensor are arranged on a first side of the distributor unit and the flow-control valve is arranged on a second side of the distributor unit.

6. The device according to claim 5, wherein the distributor unit is a distributor block, the distributor block comprising the flow-control valve, the temperature sensor, and the pressure sensor integrated into the distributor block.

7. The device according to claim 1, wherein the distributor unit is a rail.

8. The device according to claim 7, wherein the distributor unit is a common rail.

9. The device according to claim 1, wherein the distributor unit has fewer outputs than a number of injectors that the distributor unit supplies with the gaseous fuel.

10. The device according to claim 1, wherein the pressure-control unit is a mechanical pressure-control unit.

11. The device according to claim 1, wherein the pressure-control unit is designed to regulate the fixed constant output pressure level to a pressure in a range of 40-80 bar.

12. A vehicle having the device according to claim 1, wherein
an engine compartment of the vehicle forms a first zone in which the distributor unit and the flow-control valve are arranged, and
areas other than the engine compartment form a second zone in which the pressure-control unit is arranged.

13. The vehicle according to claim 12, wherein the second fluid connection between the pressure-control unit and the distributor unit extends from the first zone into the second zone, and wherein the plurality of tanks are arranged in the second zone.

14. The vehicle according to claim 12, the vehicle further comprising separating means, wherein the first zone and the second zone are separated from one another by the separating means in order to reduce vibrations, acoustic waves and/or thermal influences emanating from one of the two zones.

15. The device according to claim 1, wherein the gaseous fuel is hydrogen.

16. The device according to claim 1, wherein the flow-control valve is arranged on a quarter of the second fluid connection leading away from the distributor unit.

17. The device according to claim 1, wherein the flow-control valve is arranged on a tenth of the second fluid connection leading away from the distributor unit.

* * * * *